March 5, 1963 J. C. HACKLEY 3,080,205
PORTABLE WRITING DESK
Filed July 1, 1960 2 Sheets-Sheet 1
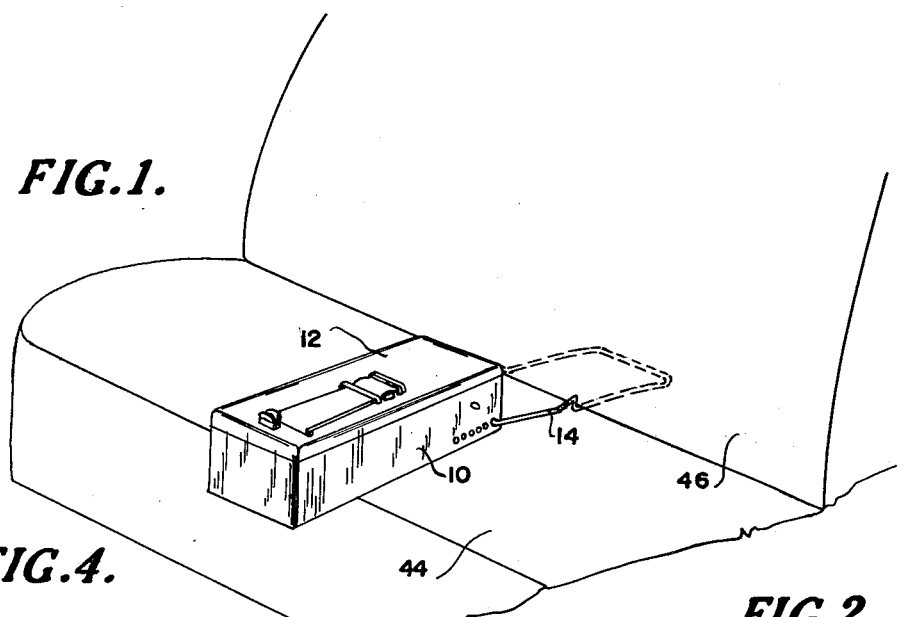
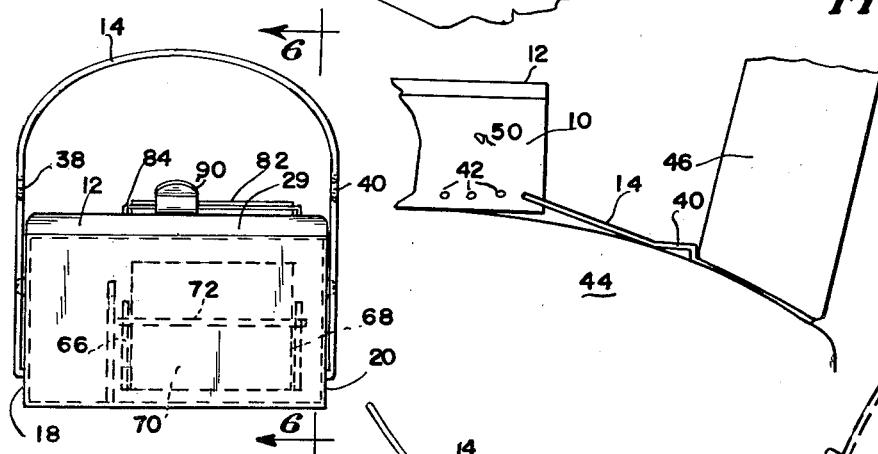
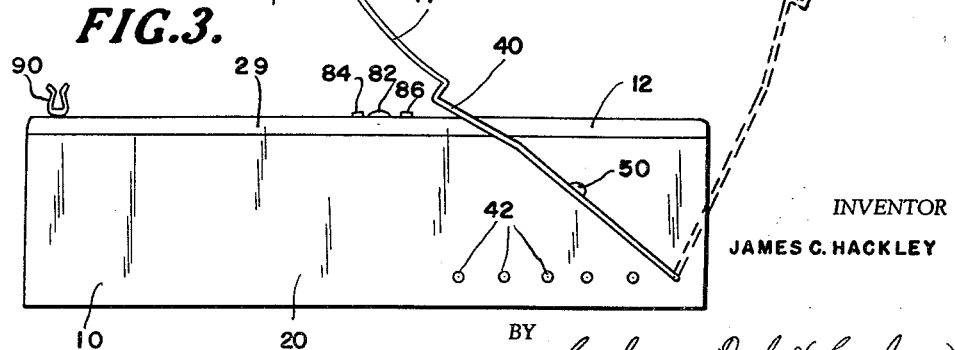
INVENTOR
JAMES C. HACKLEY
BY
ATTORNEYS March 5, 1963  J. C. HACKLEY  3,080,205
PORTABLE WRITING DESK
Filed July 1, 1960  2 Sheets-Sheet 2
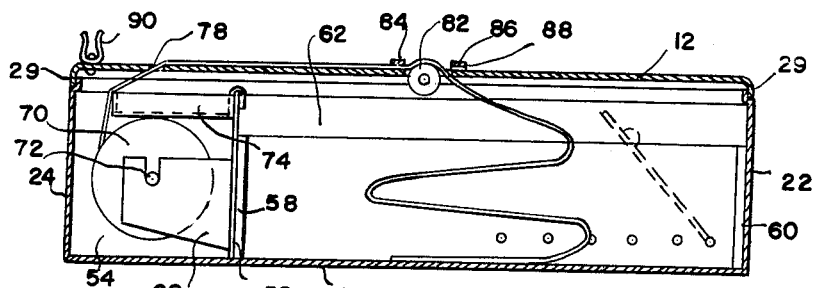
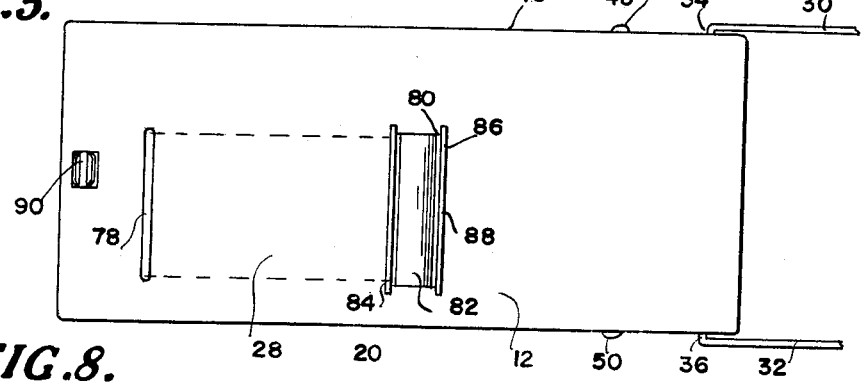
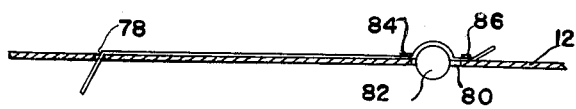
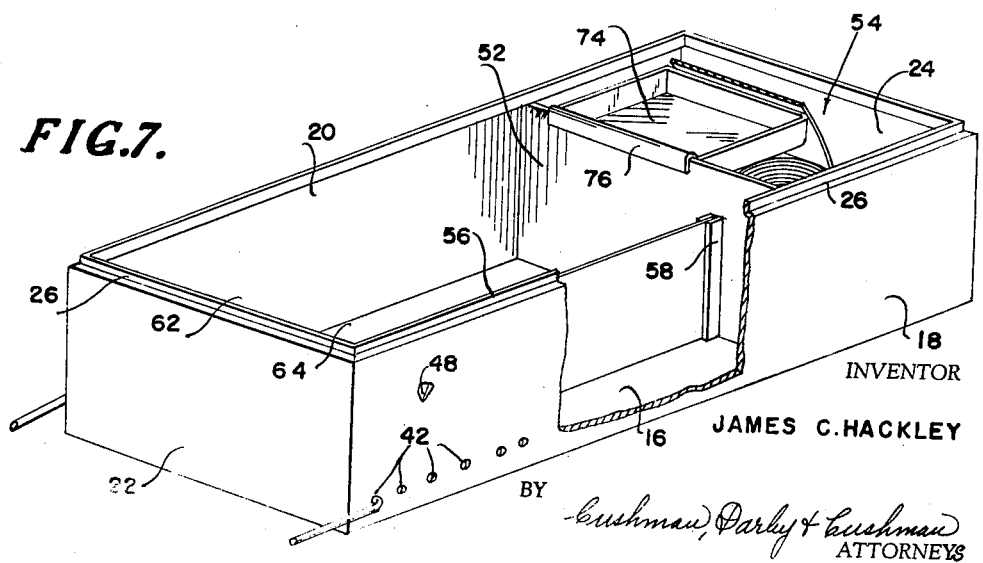
INVENTOR
JAMES C. HACKLEY
BY Cushman, Darby & Cushman
ATTORNEYS

United States Patent Office 3,080,205
Patented Mar. 5, 1963

3,080,205
PORTABLE WRITING DESK
James C. Hackley, 1320 S. 36th St., Nederland, Tex.
Filed July 1, 1960, Ser. No. 40,389
12 Claims. (Cl. 312—231)

This invention relates to writing devices and more particularly to a portable writing desk for use in combination with the seat of an automotive vehicle.

As will be appreciated, there exist many instances when the driver of an automotive vehicle, be it a car or truck or the like, finds it necessary to make notes or memoranda of some sort while in the vehicle, whether while driving or not. In the absence of the provision of readily accessible and convenient means for facilitating such note taking, making memoranda while driving can be quite hazarodus, and, whether driving or not, will be awkward and inconvenient.

It is therefore a primary object of the present invention to provide an extremely convenient portable writing desk of novel construction which may be mounted upon the seat of an automotive vehicle in a position readily accessible for the taking of notes or the like, the writing desk being provided with means for presenting a constant supply of fresh paper for the driver's use to the writing surface of the desk in a manner not requiring him to take his eyes off the road nor his hands from the wheel if he is driving.

It is a further object of the present invention to provide a novel writing desk for use in automotive vehicles of any type which is portable in nature so that it may be easily carried and conveniently mounted in an automotive vehicle or any other place where a portable desk may be required, and which is provided with an extremely useful double purpose holding means which in one instance serves as a convenient carrying handle for the portable desk and in another instance provides retention means for securing the desk in the proper position on the seat of an automotive vehicle.

Another object of the present invention is the provision of a novel portable writing desk for use in automobiles, trucks, buses, taxicabs, or the like, which in addition to providing convenient writing means, is adapted to serve as a convenient storage device for storing both completed memoranda and other various articles conventionally used by drivers, and which may also be used as an arm rest, if desired.

A further object of the present invention is the provision of a portable writing desk of novel construction adapted to use standard width rolls of paper, and provided with means whereby completed memoranda may be either conveniently stored within the desk structure, or readily detached from the remaining paper on the roll, as desired.

It is yet another object of the present invention to provide a novel portable writing desk which may be conveniently used by truckers, salesmen, taxicab drivers, bus drivers and the like, while they are in their vehicles, whether while driving or not, which is of flexible design and capable of very economical construction.

These and other objects of the present invention will become apparent from consideration of the present specification taken in conjunction with the accompanying drawings in which there is shown a single embodiment of the present invention by way of example, and wherein:

FIGURE 1 is a perspective view illustrating a portable writing desk embodying the principles of the present invention disposed upon a conventional automotive vehicle seat in an operative position;

FIGURE 2 is a side elevational fragmentary view thereof illustrating the manner in which the desk is maintained in proper position upon the automotive vehicle seat;

FIGURE 3 is a side elevational view of the embodiment illustrated in FIGURE 1;

FIGURE 4 is an end elevational view thereof;

FIGURE 5 is a plan view thereof;

FIGURE 6 is a sectional view taken along line 6—6 in FIGURE 4;

FIGURE 7 is a perspective view thereof with the cover member removed and with parts broken away; and FIGURE 8 illustrates an alternate manner in which paper may be fed through the disclosed embodiment of the invention.

Broadly speaking, the present invention relates to a portable desk arrangement comprising a box-like base structure 10 having disposed thereon a cover member 12, the upper surface of which is adapted to constitute a flat relatively hard writing surface, there being pivotally secured to one end of the base structure a U-shaped holding means 14 serving the double purpose of providing both retention means for holding the desk in position on an automotive vehicle seat and handle means for carrying the portable desk when not mounted in a vehicle. As can be seen in FIGURE 1, the portable writing desk is adapted to be located on the front seat portion of a car, truck, or the like, immediately to the right of the driver, thus it is disposed in a natural writing position, as well as in a position wherein it may provide a comfortable arm rest for the driver. As will be more fully descirbed hereinafter, the writing desk provides a readily accessible writing surface as well as a fresh supply of writing paper, obtainable without serious distraction to the driver, the invention being so arranged that the driver, if he desires to write while driving, may at all times keep at least one hand on the steering wheel. In addition, there is provided a plurality of convenient storage compartments.

Referring more particularly to the drawings, box-like base structure 10 comprises elongated bottom portion 16 having peripheral walls 18, 20, 22 and 24 extending upwardly therefrom. As can be seen, side walls 18 and 20 are disposed in an opposed parallel relationship, end walls 22 and 24 being similarly disposed with respect to each other. As is clearly disclosed in FIGURE 7 the upper edges of the four walls are offset inwardly to define a notch-like portion 26 about the peripheral upper edge of the box-like structure.

Detachably disposed above the box-like base structure 10, and supported thereby, is cover member 12 having a flat relatively hard writing surface 28 thereon. As can be seen, the cover member 12 is provided with downwardly extending peripheral flange portions 29 adapted to be received within peripheral notch-like portion 26 on the base structure, whereby when the cover member is disposed upon the base structure the resultant assembly has substantially flush side and end walls. If desired, suitable hinges may be provided between the cover member 12 and base member 10, on any desired wall.

As can be seen, holding means 14 is in the form of a generally U-shaped rod member, preferably made from spring steel wire, having substantially parallel leg portions 30 and 32. At the terminal ends of leg portions 30 and 32 there are provided inwardly directed pins 34 and 36, respectively, adapted to be pivotally secured to side walls 18 and 20, respectively. In order to maintain the desk structure in position upon an automotive vehicle seat there are provided stop means in the form of offset portions 38 and 40 intermediate the lengths of leg portions 30 and 32, respectively.

Side walls 18 and 20 are each provided with a plurality of apertures 42 disposed in a horizontal row and adapted to pivotally receive pins 34 and 36. Each of the respective apertures 42 on each of the side walls is in transverse alignment with the corresponding aperture on the opposed side wall. Thus, there are provided a plurality of pairs of apertures 42 for receiving in a pivotal relationship holding means 14. As will be appreciated, the pair of apertures 42 which will be used in any given application will depend upon the size of the automotive vehicle seat upon which the writing desk is intended to be disposed.

FIGURES 1 and 2 clearly illustrate the manner in which the portable writing desk is maintained in position upon the seat of an automotive vehicle. The box-like base structure 10 is supported by the seat portion 44 of the seat and is held in a fixed position by the pinching engagement of the adjacent opposed surfaces of seat portion 44 and back portion 46 of the automotive vehicle seat, as is best illustrated in FIGURE 2. To further prevent relative movement between the holding means 14 and the seat it is intended that offset portions 38 and 40 abut the front face of the back portion 46 of the seat in the manner illustrated.

Side walls 18 and 20 are further provided with catch means in the form of lugs 48 and 50, respectively, disposed above each of the rows of apertures 42. Thus, when holding means 14 is pivoted upwardly to a position above the base structure the leg portions 30 and 32 will snap over lugs 48 and 50, respectively, to thus be held thereby. In the illustrated embodiment lugs 48 and 50 will engage the holding means 14 when it is disposed at approximately a 45° angle. Once the holding means 14 has been so engaged by the lugs it may then be used as a handle for carrying the writing desk in an upright manner, this arrangement of the holding means being indicated in solid lines in FIGURE 3. The provision of this double purpose holding means results in a very convenient arrangement whereby the writing desk may be easily carried in an upright manner so that items stored within the base structure will not be tumbled about during carrying.

Referring to the interior of the base structure 10 there is provided a transverse partition 52 adjacent one end thereof, thus defining a transverse compartment 54 between end wall 24 and the partition 52. Also disposed within base structure 10 is a removable longitudinal partition 56 slidingly held in place by means of channel member 58 on transverse partition 52 and channel member 60 on end wall 22. As can be seen, longitudinal partition 56 defines two longitudinal compartments 62 and 64.

Disposed within transverse compartment 54 are means inthe form of brackets 66 and 68 affixed to partition 52 for pivotally supporting a roll of paper 70. Thus, brackets 66 and 68 are provided with downwardly extending slots (only one of which is shown) adapted to rotatably support axle 72 upon which the roll of paper 70 is disposed. Positioned above the roll of paper 70 is a removable tray 74, supported by means of an outwardly and downwardly extending flange portion 76 thereon engaging the upper edge of transverse partition 52.

Cover member 12 is provided with a first transverse slot 78 therethrough disposed above transverse compartment 54, and a second wider transverse slot 80 therethrough disposed above compartment 62 parallel to slot 78. Rotatably secured in slot 80 is a roller 82 having a suitable friction surface thereon. On both sides of slot 80 there are provided, on the upper surface of cover member 12, paper guide members 84 and 86, guide member 86 being provided with a straight edge 88 for tearing or cutting off paper disposed therebeneath. For purposes of convenience, there is also provided a spring clip 90 for removably holding any desired writing instrument.

In actual use paper from the roll 70 disposed within transverse compartment 54 is fed upwardly through transverse slot 78 across the writing surface 28 and beneath guide member 84. From here the paper may take one of two alternate courses, whichever is desired. In FIGURE 6 the paper is shown passing over roller 82, bypassing tearing edge 88 and passing downwardly through slot 80 into longitudinal compartment 62 wherein there may be stored completed memoranda. Alternately, the paper may be fed over roller 82 and under guide means 86, as shown in FIGURE 8, in which case, upon the completion of a note or memo, it may be torn from the remaining paper by means of the straight edge 88 on guide member 86. Regardless of the final disposition of the paper, roller 82 always serves as means for conveniently withdrawing fresh paper from the roll 70 disposed beneath the writing surface. Thus, when it is desired to introduce or present fresh paper to the writing surface 28 one need only run his hand over roller 82 away from slot 78 and fresh paper will be drawn from roll 70.

As will be noted, longitudinal compartment 62 is of a width substantially the same as that of the roll of paper, whereby it thus serves as a convenient compartment in which completed memoranda may be stored. Longitudinal compartment 64 may be used for the storage of maps or the like. The removable tray 74, on the other hand, is provided for the storage of smaller items which would be otherwise too difficult to locate if stored in one of the larger longitudinal compartments 62 or 64.

I have found that in actual applications a writing desk approximately 15 inches long, 6 inches high and 7 inches wide is of a very practical size, such an embodiment being ideally suited to receive a standard 3½ inch wide roll of paper adding machine tape as a paper supply.

Thus, there is disclosed in the above description and in the drawings an exemplary embodiment of my invention which fully and effectively accomplishes the objects of the invention. However, it will be understood by those skilled in the art that the specific details of construction and arrangement of parts, as described, are by way of example only and are not to be construed as limiting the scope of the invention. I, therefore, do not wish to be limited to the precise details set forth, and intend that the invention embody all such features and modifications as are within the scope of the appended claims.

Having thus described my invention, what I claim as new and desire to secure by Letters Patent is:

1. A portable writing desk for use in combination with the seat of an automotive vehicle, comprising: means defining a flat relatively hard writing surface; supporting means for supporting said writing surface means in a position substantially parallel to and above the seat portion of an automotive vehicle seat; retention means connected to said supporting means and adapted to be held between the adjacent surfaces of the back portion and seat portion of the seat, said retention means comprising a generally U-shaped rod member having substantially parallel leg portions, each of said leg portions being provided at its free end with means pivotally secured to said supporting means; and stop means on said retention means adapted to engage the front surface of the back portion of the seat to secure said writing desk in position, said stop means comprising a vertically offset portion formed in each of said leg portions intermediate the length thereof.

2. A device as claimed in claim 1, wherein said supporting means is provided with catch means adapted to releasably engage said leg portions when said retention means is pivoted to a position above said writing surface, whereby when said leg portions are engaged by said match means said retention means may be used as a handle to carry said writing desk in an upright manner.

3. A device as claimed in claim 2, wherein said catch means comprises a pair of oppositely disposed lugs, each of said lugs projecting into the pivotal path of movement of said retention means and adapted to engage one of the leg portions thereof.

4. A portable writing desk for use in combination with the seat of an automotive vehicle, comprising: a box-like base structure having a bottom portion and peripheral walls extending upwardly therefrom, means for rotatably supporting a roll of paper within said box-like base structure; cover means detachably secured to said base structure and having a flat relatively hard writing surface thereon, said cover means being provided with an elongated slot therethrough adapted to receive the paper from the roll disposed within said base structure, whereby paper pulled through said elongated slot may be disposed on said writing surface; retention means connected to said base structure and adapted to be held between the adjacent surfaces of the back portion and seat portion of an automotive vehicle seat; and generally vertical stop means on said retention means adapted to engage the front surface of said back portion of the seat to secure said writing desk in position.

5. A device as claimed in claim 4, wherein said paper roll supporting means is located in one end of said base structure and means are provided defining a storage compartment at the other end of said base structure, said storage compartment being at least as wide as the paper to be used, and wherein said cover means is provided with a second elongated slot therethrough above said storage compartment, whereby paper may be fed upwardly through said first mentioned elongated slot across said writing surface and downwardly through said second elongated slot to be stored in said storage compartment as it is being used.

6. A device as claimed in claim 5, wherein said storage compartment is of a width less than the total width of said base structure, whereby there is defined adjacent thereto a second storage compartment within said base structure.

7. A device as claimed in claim 4, wherein said retention means comprises a generally U-shaped rod member having substantially parallel leg portions, each of said leg portions being provided at its free end with means pivotally secured to said base structure, and wherein said stop means comprises a vertically offset portion formed in each of said leg portions intermediate the length thereof.

8. A device as claimed in claim 4, wherein said base structure is substantially rectangular in plan and is provided with means defining a transverse compartment at one end thereof, said paper roll supporting means being located in said transverse compartment means defining a plurality of longitudinal compartments at the other end thereof, and wherein said cover means is provided with a second transversely extending slot therethrough disposed above one of said longitudinal compartments, whereby paper may be fed from said transverse compartment through said first mentioned slot across said writing surface and down through said second slot into said one of said longitudinal compartments.

9. A device as claimed in claim 8, wherein said one of said longitudinal compartments is of a width substantially equal to the width of the paper to be used, and is disposed in longitudinal alignment with said paper roll supporting means in said transverse compartment.

10. A device as claimed in claim 8, wherein there is disposed in said transverse compartment above said paper roll supporting means a removable tray.

11. A device as claimed in claim 4, wherein said cover means is provided with a first slot therethrough above said paper roll supporting means, a second slot therethrough spaced from and parallel to said first mentioned slot, roller means rotatably mounted in said second slot, the axis of said roller means being disposed parallel to the axis of said second slot, and paper guide means disposed on said cover means between said slots adjacent said second slot for holding paper fed through said first mentioned slot and across said writing surface against said surface and said roller means.

12. A device as claimed in claim 11, wherein said cover means is further provided with second paper guide means disposed on said cover means adjacent said second slot on the opposite side thereof from said first-mentioned guide means, and means on said second guide means defining a straight edge for tearing off paper held thereby.

References Cited in the file of this patent
UNITED STATES PATENTS

| | | |
|---|---|---|
| 646,016 | Bradford | Mar. 27, 1900 |
| 2,524,659 | Gorman | Oct. 3, 1950 |
| 2,633,180 | Reed | Mar. 13, 1953 |
| 2,646,838 | Welsh | July 28, 1953 |
| 2,692,638 | Castell | Oct. 26, 1954 |
| 2,934,391 | Bohnett | Apr. 26, 1960 |
| 2,971,572 | Watkins | Feb. 14, 1961 |